US008980393B2

(12) United States Patent
Parker

(10) Patent No.: US 8,980,393 B2
(45) Date of Patent: Mar. 17, 2015

(54) PRINTABLE BOOK BINDING STRUCTURE

(71) Applicant: Kevin P Parker, Berkeley, CA (US)

(72) Inventor: Kevin P Parker, Berkeley, CA (US)

(73) Assignee: Powis Parker Inc., Berkelely, CA (US)

( * ) Notice: Subject to any disclaimer, the term of this patent is extended or adjusted under 35 U.S.C. 154(b) by 0 days.

(21) Appl. No.: 13/831,179

(22) Filed: Mar. 14, 2013

(65) Prior Publication Data

US 2014/0272239 A1 Sep. 18, 2014

(51) Int. Cl.

| | |
|---|---|
| ***B32B 9/00*** | (2006.01) |
| ***B32B 33/00*** | (2006.01) |
| ***B42D 3/00*** | (2006.01) |
| ***B42D 1/10*** | (2006.01) |
| ***B42D 1/00*** | (2006.01) |
| *B42C 9/00* | (2006.01) |

(52) U.S. Cl.

CPC ............... *B42D 3/002* (2013.01); *B42C 9/0056* (2013.01); *B42D 1/10* (2013.01); *B42D 1/00* (2013.01)

USPC ....... 428/42.1; 428/40.1; 428/42.3; 428/42.2; 281/21.1; 281/23

(58) Field of Classification Search

CPC ............ B42F 11/00; B42D 1/00; B42D 1/10; B42C 9/00; B42C 9/0056; B42C 9/0068; B42C 9/0075; C09J 7/02; G09F 3/02; G09F 3/0286; G09F 3/0288; G09F 3/0289

USPC ..................... 428/40.1, 42.2, 42.3; 412/1–43; 281/21.1

See application file for complete search history.

(56) References Cited

U.S. PATENT DOCUMENTS

2012/0037302 A1 * 2/2012 Valenti et al. ................ 156/234

* cited by examiner

*Primary Examiner* — Patricia L Nordmeyer
(74) *Attorney, Agent, or Firm* — Girard & Equitz LLP

(57) ABSTRACT

A book binding structure which includes at least one adhesive binder strip and a pair of supporting sheets for supporting the binder strip during a binder strip printing process. Opposite ends of the binder strip are supported on separate support sheets, which are coupled together only by way of the binder strip to allow independent movement of the ends of the binder strip. The sheets are arranged to support the binder strip as is passes along the paper path of a conventional printer.

20 Claims, 4 Drawing Sheets

PRINTABLE BOOK BINDING STRUCTURE

BACKGROUND OF THE INVENTION

1. Field of the Invention

The present invention relates generally to the field of bookbinding and in particular to binder strips used in binding a stack of sheets to form a bound book.

2. Description of Related Art

Binder strips utilizing heat activated adhesives are commonly used to bind a stack of sheets utilizing a desk top binding machine. A typical binder strip is disclosed in USPNo. 4,496,617, the contents of which are fully incorporated herein by reference. Referring to the drawings, FIG. 1A/B depict such a conventional binder strip 18. One side 18B of the strip, as shown in FIG. 1B includes a layer of heat activated adhesive which is formed on a flexible substrate of paper or plastic. A conventional binding machine operates to apply heat and pressure to the binder strip and to fold the strip around the edge of a stack of sheets to be bound. The adhesive, upon cooling, secures the edges of the sheets together and also to the substrate. Binder strips are available in differing widths to accommodate stacks of differing thickness. A typical binding machine for carrying out the actual binding process is disclosed in U.S. Pat. No. 5,052,873, the contents of which are also fully incorporated herein by reference.

It is frequently desirable to provide descriptive information and other graphics on the printable side 18A of FIG. 1A of the binder strip before a book is bound. Such graphics may include, by way of example, a title, a listing of authors and/or a company logo. U.S. Pat. No. 6,027,265, the contents of which are also fully incorporated herein by reference, discloses a desk top binder strip printing machine capable of printing binder strips. This printing machine is capable of reliably printing binder strips, including strips which have roughly textured surfaces. However, the machine is dedicated to printing binder strips and is significantly more expensive than most desk top printers.

There is a need for a book binding structure which enables the printing of binder strips using conventional, general purpose printers. As will become apparent upon a reading of the following Detailed Description of the Invention together with the drawings, the present invention provides these and other advantages.

SUMMARY OF THE INVENTION

A book binding structure is disclosed for enabling the printing of graphics on binder strips used in binding books. The structure includes at least one elongated adhesive binder strip, a support sheet and an extension sheet. Each of the binder strips includes a printing side and an adhesive side opposite the printing side. The adhesive sides each include first and second opposite end portions and an intermediate portion disposed intermediate the end portions with the intermediate portion comprising a majority of a length of the binder strip. Only the first end portion of the at least one binder strip is secured to the support sheet, with only the second end portion being secured to the extension sheet, with the intermediate portion of the adhesive side being unsecured to either the support or the extension sheets. Preferably the extension sheet extends past the trailing edge of the binder strip a minimum distance The support and extension sheets support the at least one binder strip as is passes through the paper path of a conventional printer. This arrangement decouples the opposite ends of the binder strip from one another to compensate for dimensional changes in the binder strips even after being mounted on the support and extension sheets. In addition, the extension sheet helps to secure the trailing ends of the binder strips as they pass under the print head.

DETAILED DESCRIPTION OF THE INVENTION

Referring again to the drawings, FIGS. 3-6 illustrate one embodiment 20 of the subject book binding structure. This embodiment permits three binder strips 26, 30 and 34 to be simultaneously printed, preferably using a conventional desk top ink jet printer. (Laser printers produce heat during the printing process which is likely to activate the binder strip adhesive, possibly resulting in damage to the printer.) It should be noted that additional binder strips can be provided, particularly if narrower strips are to be printed. In addition, the number of strips can be reduced from three to two or even to one, although the present invention is particularly suited for simultaneously printing multiple strips.

Figure 3:
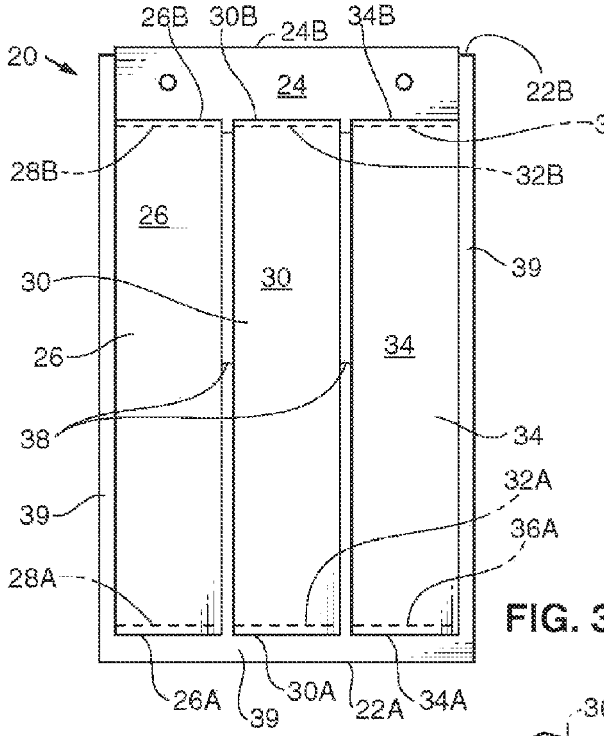
FIG. 3 is a plan view of the book binding structure of FIG. 2 prior to printing.
Figure 4:
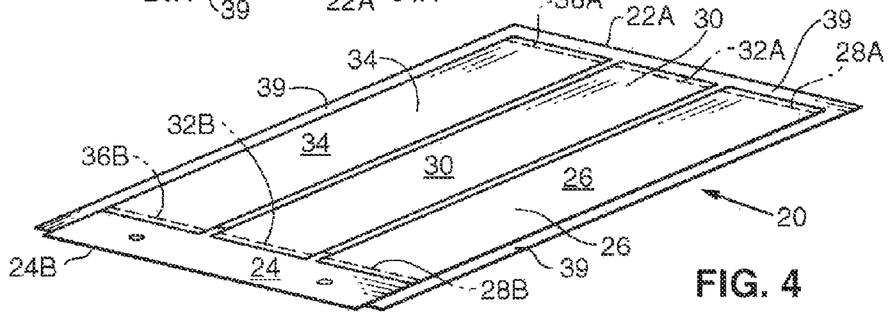
FIG. 4 is a perspective view of the FIG. 3 book binding structure.
Figure 5:
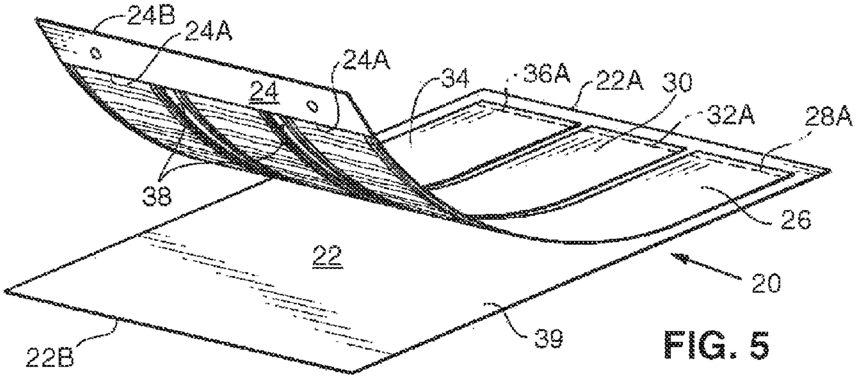
FIGS. 5 and 6 are further perspective views of the FIG. 3 book binding structure illustrating that one end of the binder strips in the book binding structure is free to move with respect to the opposite end.
Figure 6:
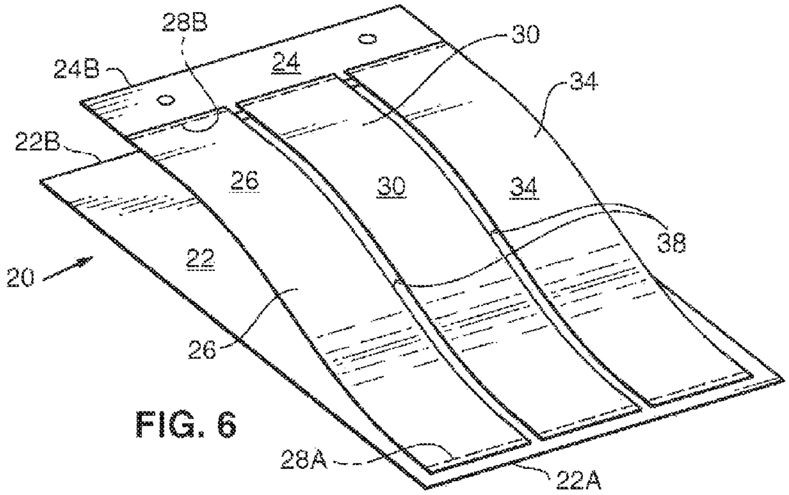

The subject book binding structure 20 has a form factor compatible with conventional desk top ink jet printers. The structure includes a support sheet 22, preferably made from paper stock, that is somewhat wider than the total width of the binder strips 26, 30 and 34 and somewhat longer than the strips. These dimensions provide margins 39 around the perimeter of the support sheet 22 which compensates for printer overspray on three sides. The support sheet 22 has a leading edge 22A that is fed first into the printer input and an opposite trailing edge 22B (FIG. 5). The binder strips are positioned on support sheet 22 so that the respective leading edges 26A, 32A and 34A of the strips are adjacent the leading edge 22A of the sheet as shown in FIG. 3. The leading edges of each strip are secured to the support sheet 22. Preferably, this is accomplished by selectively applying heat to a small region of the strip substrate at the strip end so as to activate a small portion of the underlying strip adhesive. This causes each strip to be tacked to the support sheet as indicated by respective drawing elements 28A, 32A and 36A. Once printing has been carried out, a user can then manually separate the strips from the support sheet 22 prior to binding. The strips are positioned laterally over sheet 22 to provide gaps 38 between the strips to further accommodate printer overspray. Note also that the strips are tacked only at the respective extreme ends of the strip, with the intermediate central portion of the strip being free floating. Preferably, the intermediate central portion comprises at least a majority (50%) of the length of the elongated binder strips and preferably at least 80%.

The opposite or trailing edges 26B, 32B and 36B are tacked in a similar manner to an extension sheet 24, near the leading edge 24A of the sheet as can best be seen in FIG. 5. Respective drawing elements 28B, 32B and 34B indicate the regions where the strip adhesive tacks the trailing edges of the strips to extension sheet 24. Extension sheet is also preferably made from paper stock. Again, once printing has been carried out, a user can then manually separate the strips from the extension sheet 24 prior to binding. The extension sheet 24 has a width about equal to that of support sheet 22 and a length such that the distance between the trailing edges 28B, 32B and 36B of the binder strips and the trailing edge 24B of the sheet is at least one inch, preferably approximately one and one-half inches. As will be explained in greater detail, the length of the extension sheet is dictated by the paper feed mechanism of conventional ink jet printers such as printer 44 of FIG. 8.

Note that extension sheet 24 further functions to receive printer overspray near the trailing edges 26B, 30B and 34B of the binder strips. In addition, the regions on support sheet 22 located behind gaps 38 also receive printer overspray. Thus, ink is not deposited on the printer paper drive mechanism during the printing process.

In order to carry out the printing process, it is first necessary to configure the printer in the conventional manner to provide the desired graphics for the binder strips.

This can be done by first preparing a printing template that defines the boundaries of the three binder strips. The graphics themselves can readily be produced using readily available software such as Adobe Illustrator®. It is possible to configure the printer to provide the same or different graphics for each of the strips.

Figure 1A:
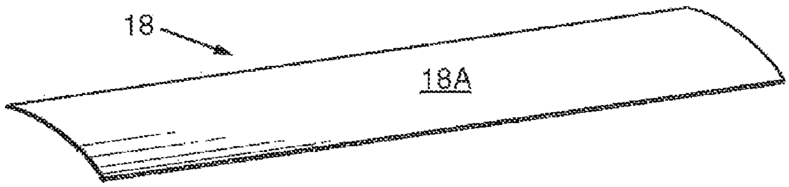
FIG. 1A (PRIOR ART)
FIG. 1A/B depict a conventional individual binder strip.
Figure 1B:
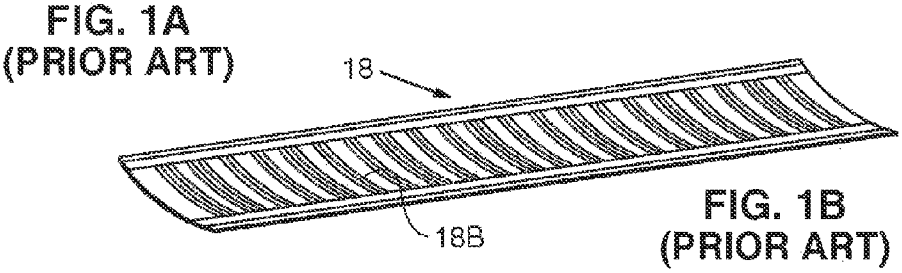
FIG. 1B (PRIOR ART)
Figure 2:
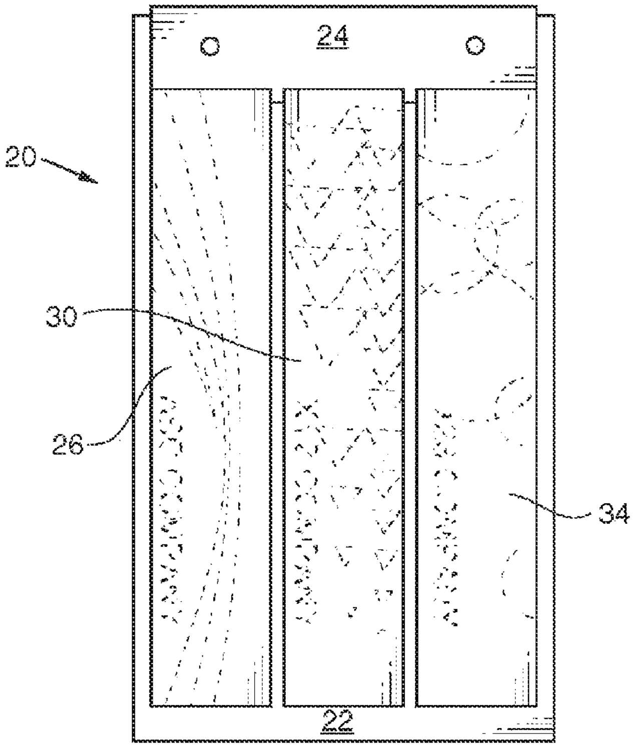
FIG. 2 is a plan view a book binding structure in accordance with one aspect of the present invention showing three binder strips after printing.
Figure 8:
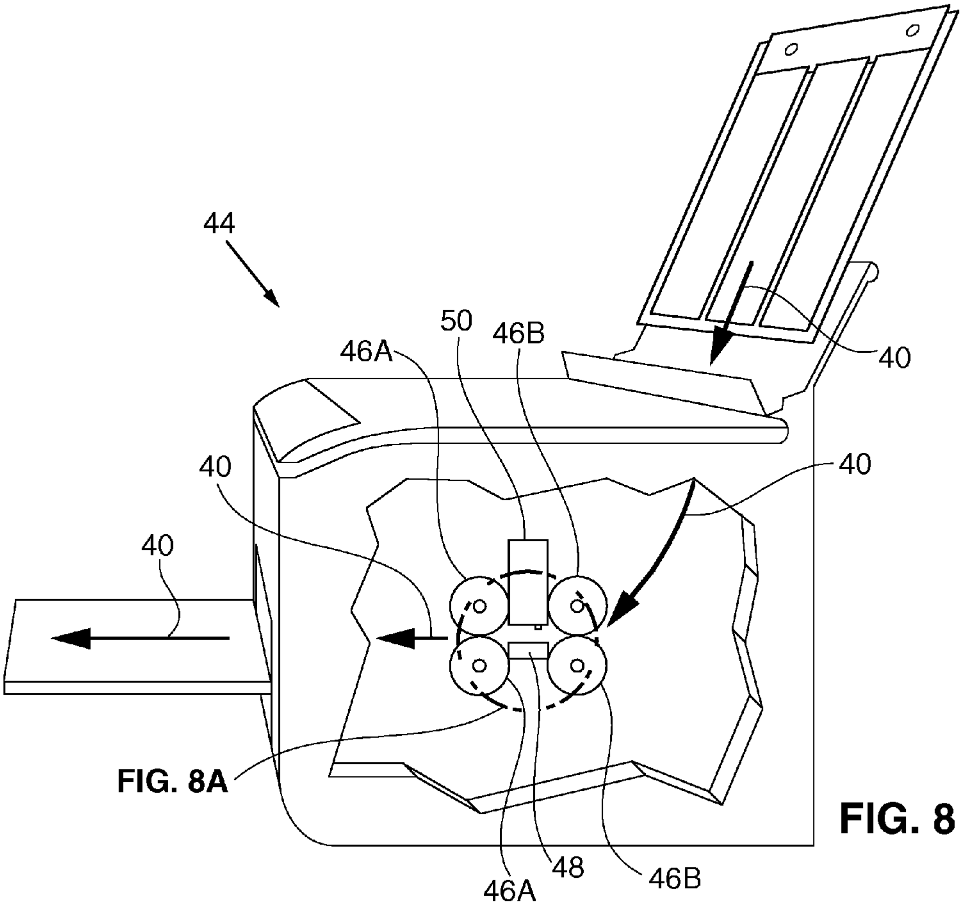
FIG. 8 is a simplified diagram of a portion of a conventional ink jet printer.

Referring to FIG. 8, once the printer, such as printer 44, has been set up, the bookbinding structure 20 is inserted in the paper input of the printer, with the leading edge 22A being fed first. The paper drive mechanism of the printer includes a first pair of pinch rollers 46A and a second pair of pinch rollers 46B which define part of a paper path through the printer as indicated by arrows 40. A print head mechanism 50 is disposed over the paper path intermediate the pinch roller pairs, with a platen 48 being located below the path, under the print head mechanism. FIG. 2 shows the bookbinding structure 20 after printing including exemplary graphics on each of the strips. Once the printing has been carried out, the three binder strips can be readily manually separated from sheets 22 and 24 and when used to bind a book.

Figure 7A:
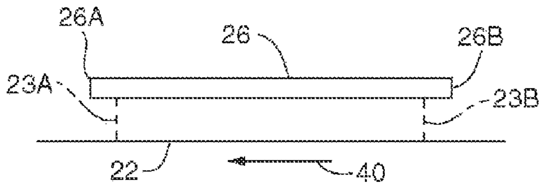
FIG. 7A/B/C are simplified schematic diagrams which facilitate an understanding of the operation of the subject book binding structure.

A better appreciation of the subject bookbinding structure 20 can be provided in connection with the simplified schematic diagrams of FIG. 7A/B/C. FIG. 7A shows one approach where a single support sheet 22 is used. One or more binder strips 26 are secured at opposite ends to the underlying sheet 22 by adhesive tacking as indicated by drawing elements 23A/B. However, it is not usually possible to match the physical characteristics of the binder strips with the support sheet. Much of the difference is due to the presence of the adhesive on the strip 26 which reacts to moisture content differently than sheet 22. This frequently causes the effective length of the strip to increase slightly after being tacked onto the support sheet. When the structure passes through the two pairs of pinch rollers 46A and 46B the leading edge 24A is forced against sheet 22. As the structure progresses along the paper path in the direction indicated by arrow 40, the pinch rollers will eventually cause the strip to buckle up slightly in the region around the trailing edge 26B of the strip due to the slight increase in the binder strip length. This buckling will frequently result in an unattractive smearing of the graphics in this region.

Figure 7B:
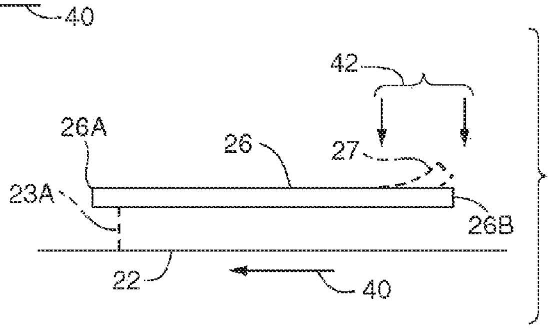

FIG. 7B shows another approach where only the leading edge 26A of the strip is attached to support sheet 22 by way of tacking 23A. The remainder of the strip, including the trailing edge 26B, is left free floating. Thus, any change in the binder strip 26 characteristic visa vie the support sheet will not create the strip buckling as previously described in connection with FIG. 7A. However, in some cases when the trailing edge 26B arrives at a location intermediate the pinch rollers as indicated by arrows 42, the trailing edge may tend to curl up as shown in phantom designated by numeral 27. Once again, this may result in smearing of the graphics near the trailing end of the strip.

Figure 7C:
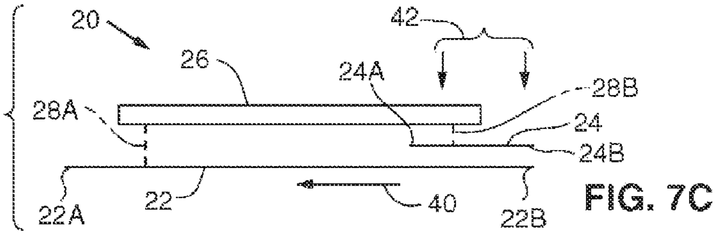
Figure 8A:
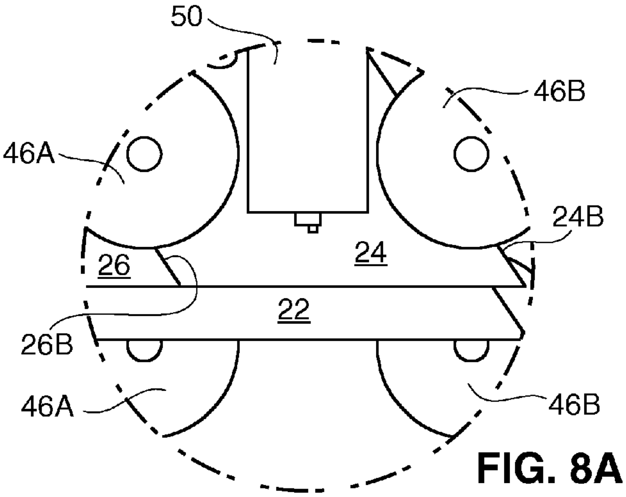
FIG. 8A is an expanded view of the print head and paper feed aspects of the FIG. 8 printer showing a part of the subject book binding structure.

Referring now to FIG. 7C which represents one embodiment of the present invention, as previously described, the leading edge of strip 26 is attached near a leading edge 22A of the support sheet 22 by adhesive tack 28A. The trailing edge of the strip is attached near the leading edge 24A of the extension sheet 24, with the length of the sheet being great enough to span the distance 42 between the pinch roller pairs. Thus, when the structure 20 is driven to the point the trailing edge of the strip is intermediate the pinch roller pair, extension sheet 24 will still be gripped by pinch roller pair 46B (FIG. 8A) thereby preventing the trailing edge from curling up as depicted in FIG. 7B. Further, since the extension sheet 24 is not connected to the support sheet 22, other than by way of binder strip 26 (or by way of multiple binder strips), the trailing edge of the strip is free floating with respect to the leading edge so that any change in the binder strip characteristics after mounting on the sheets 22 and 24 does not result in graphic smearing as was the case previously described in connection with FIG. 7A. Note that support sheet 22 should extend past the leading edge 24A of the extension sheet 24 as shown in FIG. 7C to reduce the likelihood that the leading edge will get stuck in the drive mechanism. To this end, it is also preferable that the adhesive tack 28B be located close to the leading edge 24A of the sheet to reduce that likelihood that the leading edge will get caught in the drive mechanism.

Thus, a novel bookbinding structure has been disclosed. Although one embodiment has been described in some detail, it is to be understood that various changes can by made by those skilled in the art without departing from the spirit and scope of the invention as defined by the appended claims.

What is claimed is:

1. A book binding structure comprising:

a support sheet including first and second opposite edges;

an extension sheet including first and second opposite edges;

at least two elongated adhesive binder strips with each including first and second opposite end portions and an intermediate portion disposed intermediate the end portions with the intermediate portion comprising a majority of a length of the binder strips, with the first end portion of the binder strips being secured to the support sheet, and with the second end portion of the binder strips being secured to the extension sheet and wherein the first and second end portions are secured together only by way of the intermediate portion of the associated binder strip.

2. The book binding structure of claim 1 wherein each of the at least two adhesive binder strips includes a layer of heat activated adhesive for binding and wherein the first portion and second portion of each of the binder strips are secured to the respective support sheet and extension sheet by way of the heat activated adhesive.

3. The binding structure of claim 2 wherein each of the at least two binder strips is secured to the support sheet exclusively by way of the adhesive at the first portion of the binder strips and wherein the at least two binder strips is secured to the extension sheet exclusively by way of the adhesive at the second portion of the binder strips.

4. The book binding structure of claim 3 wherein at least a portion of the extension sheet is disposed intermediate the at least two binder strips and the support sheet.

5. The book binding structure of claim 4 wherein the second edge of the extension sheet extends past the second end portion a distance of at least one inch.

6. A book binding structure comprising:

a support sheet including first and second opposite edges;

an extension sheet including first and second opposite edges;

at least two elongated adhesive binder strips with each including a printing side, an adhesive side opposite the printing side, with each of the at least two binder strips including first and second opposite end portions and an intermediate portion disposed intermediate the end portions with the intermediate portion comprising a majority of a length of the binder strips, with the support sheet being secured to the binder strips only by way of the first portions of the binder strips and with the extension sheet being secured to the binder strips only by way of the second portions of the binder strips.

7. The book binding structure of claim 6 wherein the support sheet and the extension sheet are attached to one another only by way of the at least two elongated adhesive binder strips.

8. The book binding structure of claim 7 wherein at least a portion of the extension sheet is disposed intermediate the at least two binder strips and the support sheet.

9. The book binding structure of claim 6 wherein the second edge of the extension sheet extends past the second end portion a distance of at least one inch.

10. The book binding structure of claim 6 wherein the at least two adhesive binder strips each include heat activated adhesive disposed on the adhesive side and each of the first end portions are secured to the support sheet and each of the second end portions are secured to the extension sheet by way of the heat activated adhesive.

11. The book binding structure of claim 10 wherein the at least two elongated binder strips are positioned on the support sheet and extension sheet to provide a gap intermediate adjacent binder strips.

12. The book binding structure of claim 10 wherein the at least two adhesive binder strips include at least three elongated binder strips.

13. The book binding structure of claim 12 wherein the at least three elongated binder strips are positioned on the support sheet and extension sheet to provide a gap intermediate adjacent binder strips.

14. A book binding structure comprising:

a support sheet including first and second opposite edges;

an extension sheet including first and second opposite edges;

first, second and third elongated binder strips, with each strip including first and second opposite end portions and at least one intermediate portion intermediate the first and second end portions, with each of the binder strips secured to the support sheet at the respective first end portions and secured to the extension sheet at the respective second portions and wherein the intermediate portion is unsecured to the support and extension sheets and wherein the support sheet and the extension sheet are secured together only by way of the elongated binder strips.

15. The book binding structure of claim 14 wherein the intermediate portion comprises at least a majority of a length of the binder strips.

16. The book binding structure of claim 15 wherein the second opposite edge of the extension sheet extends past the second end portion of the elongated binder strips a distance of at least one inch.

17. The book binding structure of claim 16 wherein the elongated binder strips are positioned on the support and extension sheets in a spaced apart manner so that gaps are formed intermediate adjacent ones of the binder strips.

18. The book binding structure of claim 14 wherein the first, second and third elongated binder strips are adhesive binder strips which include binding adhesive and where the elongated binder strips are each secured to the support and extension sheets by way of the binding adhesive.

19. The book binding structure of claim 18 wherein the first, second and third elongated binder strips are secured to the support sheet only at the respective first end portions and are secured to the extension sheet only at the respective second end portions.

20. The book binding structure of claim 14 wherein at least a portion of the extension sheet is disposed intermediate the first, second and third binder strips and the support sheet.

* * * * *